(12) United States Patent
Tagtow et al.

(10) Patent No.: US 12,113,392 B2
(45) Date of Patent: *Oct. 8, 2024

(54) PORTABLE CHARGER

(71) Applicants: Patrick Tagtow, Houston, TX (US); Daniel Craig Tagtow, Austin, TX (US); Jeffrey William Bull, Naperville, IL (US)

(72) Inventors: Patrick Tagtow, Houston, TX (US); Daniel Craig Tagtow, Austin, TX (US); Jeffrey William Bull, Naperville, IL (US)

(\*) Notice: Subject to any disclaimer, the term of this patent is extended or adjusted under 35 U.S.C. 154(b) by 0 days.

This patent is subject to a terminal disclaimer.

(21) Appl. No.: 18/350,490

(22) Filed: Jul. 11, 2023

(65) Prior Publication Data

US 2023/0352965 A1 Nov. 2, 2023

Related U.S. Application Data

(63) Continuation of application No. 17/819,617, filed on Aug. 12, 2022, now Pat. No. 11,750,020, which is a continuation of application No. 17/248,379, filed on Jan. 22, 2021, now Pat. No. 11,451,083, which is a continuation of application No. 16/787,468, filed on Feb. 11, 2020, now Pat. No. 10,910,871, which is a continuation of application No. 15/786,439, filed on Oct. 17, 2017, now Pat. No. 10,574,072.

(51) Int. Cl.
*H02J 7/34* (2006.01)
*H02J 7/00* (2006.01)

(52) U.S. Cl.
CPC .............. *H02J 7/342* (2020.01); *H02J 7/00* (2013.01); *H02J 7/0042* (2013.01)

(58) Field of Classification Search
CPC ............. H02J 7/342; H02J 7/00; H02J 7/0042
USPC ......................................................... 320/107
See application file for complete search history.

(56) References Cited

U.S. PATENT DOCUMENTS

| | | |
|---|---|---|
| 2008/0174265 A1 | 7/2008 | Toya |
| 2008/0197803 A1 | 8/2008 | Daniel et al. |
| 2010/0069117 A1 | 3/2010 | Knighton |
| 2012/0169272 A1* | 7/2012 | Khalepari .......... H01R 13/6675 320/107 |
| 2013/0193911 A1 | 8/2013 | Miller et al. |
| 2013/0200841 A1* | 8/2013 | Farkas ...................... H02J 7/00 320/107 |
| 2014/0152257 A1 | 6/2014 | Miller et al. |
| 2014/0170903 A1 | 6/2014 | Tuchrelo et al. |
| 2014/0281139 A1 | 9/2014 | Smurthwaite |

(Continued)

OTHER PUBLICATIONS

Leef Bridge 3.0 (16GB) Review and Rating, PC Mag.com, Dec. 3, 2014, Accessed on Jun. 20, 2017, http://www.pcmag.com/article2/0,2817,2473026,00.asp.

(Continued)

*Primary Examiner* — Paul Dinh
(74) *Attorney, Agent, or Firm* — MLO, a professional corp.

(57) ABSTRACT

An apparatus includes a power-providing connector port configured to be directly coupled to an external device without an intervening cable or an adapter connected between the apparatus and the external device. An internal battery is coupled to the power-providing connector port and configured to provide power via the power-providing connector port to the external device.

15 Claims, 11 Drawing Sheets

(56) References Cited

U.S. PATENT DOCUMENTS

| | | | |
|---|---|---|---|
| 2015/0015204 A1* | 1/2015 | Sorias | H02J 7/0044 |
| | | | 320/111 |
| 2016/0308569 A1 | 10/2016 | Wei | |
| 2017/0093190 A1 | 3/2017 | Miller et al. | |
| 2017/0110898 A1 | 4/2017 | Kyriakoulis et al. | |
| 2018/0006477 A1 | 1/2018 | Ezzi | |
| 2018/0069358 A1 | 3/2018 | Miller et al. | |
| 2018/0102654 A1 | 4/2018 | Miller et al. | |

OTHER PUBLICATIONS

"Slide USB 3.0 OTG Flash Drive", 2017, Accessed on Jun. 20, 2017, http://www.integralmemory.com/product/slide-usb-3.0-otg-superspeed-flash-drive.
Borghino, "iKlips dual flash drive for iPhones, iPads, Macs and PCs is faster than the rest," Mar. 30, 2015, Accessed on: Jun. 20, 2017, http://newatlas.com/iklips-usb-lighning-flash-drive-details/36794/.
Ex parte Quayle Office Action dated Aug. 9, 2019 for U.S. Appl. No. 15/786,439.
Notice of Allowance and Fees dated Apr. 27, 2023 for U.S. Appl. No. 17/819,617.
Notice of Allowance and Fees dated Jul. 28, 2022 for U.S. Appl. No. 17/248,379.
Notice of Allowance dated Oct. 1, 2020 for U.S. Appl. No. 16/787,468.
Notice of Allowance dated Oct. 25, 2019 for U.S. Appl. No. 15/786,439.
Office Action dated Apr. 11, 2022 for U.S. Appl. No. 17/248,379.
Office Action dated Jan. 23, 2023 for U.S. Appl. No. 17/819,617.

* cited by examiner

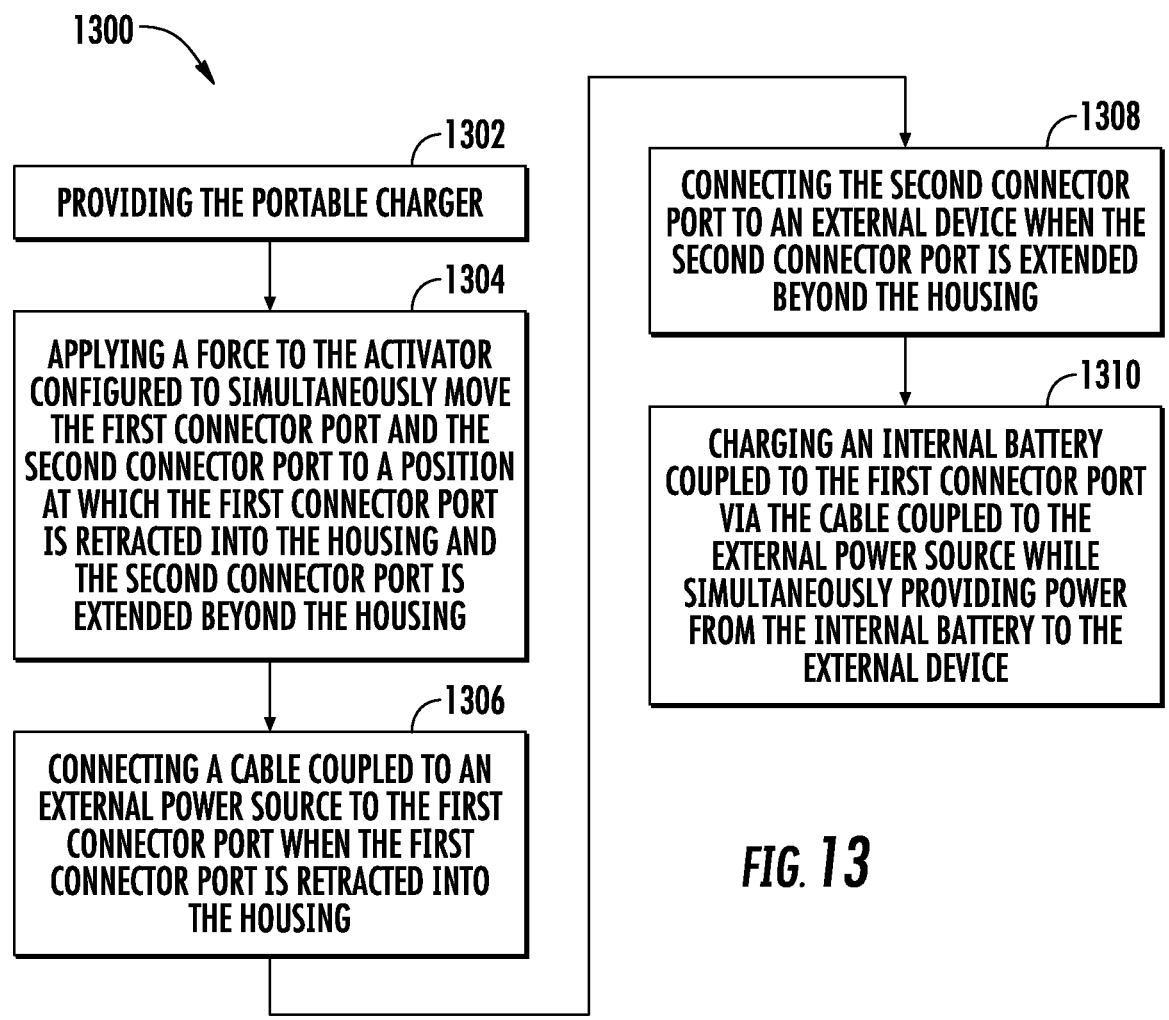

PORTABLE CHARGER

RELATED APPLICATIONS

This application is a continuation of U.S. patent application Ser. No. 17/819,617 filed on Aug. 12, 2022, and entitled "PORTABLE CHARGER", which is a continuation of U.S. patent application Ser. No. 17/248,379 (now U.S. Pat. No. 11,451,083) filed on Jan. 22, 2021, and entitled "PORTABLE CHARGER", which is a continuation of U.S. patent application Ser. No. 16/787,468 (now U.S. Pat. No. 10,910,871) filed on Feb. 11, 2020, and entitled "PORTABLE CHARGER", which is a continuation of U.S. patent application Ser. No. 15/786,439 (now U.S. Pat. No. 10,574,072) filed on Oct. 17, 2017, and entitled "PORTABLE CHARGER," which are hereby incorporated by reference for all purposes.

BACKGROUND

People rely heavily on portable, electronic devices such as mobile phones, tablets or smartwatches, for business or pleasure throughout the day. For instance, email, texting, mobile gaming, internet surfing, financial business transactions, and streaming video content are managed via the portable, electronic devices. With use, the internal battery on these devices eventually runs out of power, and when this occurs, the portable, electronic device becomes a useless gadget until it is charged.

Portable chargers are available in different forms or configurations in the market. Some are large and bulky, thus not easily portable. Other have rough surfaces, sharp corners, sharp edges, and above-surface buttons that can be inadvertently activated (thus draining the capacity for providing power of the portable charger). Moreover, conventional portable chargers have inconvenient accessory cables that are necessary to operate the portable charger. For example, a cable may be necessary to connect the portable charger to the power source while charging the portable charger or a (same or different) cable may be needed to connect the portable charger to the portable, electronic device while charging the device.

SUMMARY

In some embodiments, an apparatus is disclosed herein and includes a housing, a first connector port, a second connector port, and an internal battery. The second connector port is configured to be directly coupled to an external device without an intervening cable or an adapter connected between the apparatus and the external device. The internal battery is coupled to the first connector port and the second connector port. The internal battery is configured to be charged via the first connector port from an external power source and configured to provide power via the second connector port to the external device.

In some embodiments, an apparatus is disclosed herein and includes a housing, a first connector port, a second connector port, an activator, and an internal battery. The second connector port is configured to be extended beyond the housing and retracted into the housing. The second connector port is configured to be directly coupled to an external device without an intervening cable or an adapter connected between the apparatus and the external device. The activator is configured to move the second connector port when a force is applied to the activator. The internal battery is coupled to the first connector port and the second connector port. The internal battery is configured to be charged via the first connector port from an external power source and configured to provide power via the second connector port to the external device.

An apparatus is disclosed herein and includes a housing having a first connector port at a first end of the housing and a second connector port at a second end of the housing. The first end of the housing and the second end of the housing are opposite one another. An activator is configured to simultaneously move the first connector port and the second connector port when a force is applied. When the first connector port is extended beyond the housing, the second connector port is retracted into the housing, and when the second connector port is extended beyond the housing, the first connector port is retracted into the housing. An internal battery is coupled to the first connector port and configured to be charged via the first connector port from an external power source, and coupled to the second connector port and configured to provide power via the second connector port to an external device.

A method is disclosed herein and includes providing an apparatus. The apparatus includes an internal battery, an activator and a housing. The activator is configured to simultaneously move a first connector port and a second connector port. The housing has the first connector port at a first end of the housing and the second connector port at a second end of the housing. The first end of the housing and the second end of the housing are opposite one another. A force is applied to the activator. The activator is configured to simultaneously move the first connector port and the second connector port to a position at which the first connector port is retracted into the housing and the second connector port is extended beyond the housing. In some embodiments, when the activator is located at a midpoint between the first end of the housing and the second end of the housing, the first connector port and the second connector port are retracted into the housing. In some embodiments, a cable coupled to an external power source is connected to the first connector port when the first connector port is retracted into the housing. The second connector port is connected to an external device when the second connector port is extended beyond the housing. An internal battery coupled to the first connector port is charged via the cable coupled to the external power source while simultaneously providing power from the internal battery to the external device.

A method is also disclosed herein and includes applying a force to an activator of an apparatus. The apparatus has an internal battery and a housing. The housing has a first connector port at a first end of the housing and a second connector port at a second end of the housing. The first end of the housing and the second end of the housing are opposite one another. The first connector port and the second connector port are simultaneously moved to a position at which the first connector port is retracted into the housing and the second connector port is extended beyond the housing. The second connector port is connected to an external device, without an intervening cable therebetween. Power from the internal battery is provided to the external device.

The first connector port may be a USB connector, a mini-USB connector or a micro-USB connector. The first connector port is configured to be coupled to a cable when the first connector port is retracted into the housing. The second connector port may be a USB connector, a mini-USB connector, a micro-USB or a Lightning™ connector. The second connector port is configured to be directly coupled to the external device without a cable or an adapter therebetween.

In some embodiments, the apparatus includes circuitry coupled to the internal battery enabling the internal battery to be charged while simultaneously providing power to the external device. In some embodiments, the first connector port is configured to be connected to the external power source without the use of a cable therebetween. The internal battery is configured to be charged from the external power source without the use of a cable via the first connector port. The internal battery may be configured to be charged from the external power source via a cable coupled to the first connector port. The internal battery is configured to be charged from an external power source via a cable coupled to the first connector port when the first connector port is retracted into the housing. The internal battery is configured to be charged from an external power source when the first connector port is retracted into the housing while simultaneously providing power to the external device when the second connector port is extended beyond the housing.

In some embodiments, the apparatus includes an opening in the first end of the housing through which the first connector port is extended beyond the housing and retracted into the housing, and a cable with a first cable connector plug configured to be inserted through the opening and into the housing and to be coupled to the first connector port when the first connector port is retracted into the housing.

BRIEF DESCRIPTION OF THE DRAWINGS

FIG. 13 illustrates a method for charging the portable charger while providing power to an external device, in accordance with some embodiments.

DETAILED DESCRIPTION

An improved portable charger for charging electronic devices is described herein. This is a small, lightweight, smooth, pocketable portable charger that is self-contained and fully functional. In some embodiments, the portable charger is used without external cables to manage and keep track of. It is designed to fit comfortably in a pants pocket or small purse (or other appropriate carrying element) without adding significant weight or occupying much room. Since the portable charger does not need cables to charge itself or connect to external elements, an advantage of the portable charger is that such cables do not have to be carried with the portable charger, thereby enhancing the convenience, attractiveness, and usability of the portable charger. In some embodiments, the portable charger is configured to be charged while simultaneously providing power to an electronic device. The design of the portable charger prevents damage from occurring to the connector ports, debris from accumulating in the device, or inadvertently activating the device (which would drain the internal battery, thus diminishing the power capacity). Other benefits, advantages and improvements will become apparent from the description herein.

Figure 1:
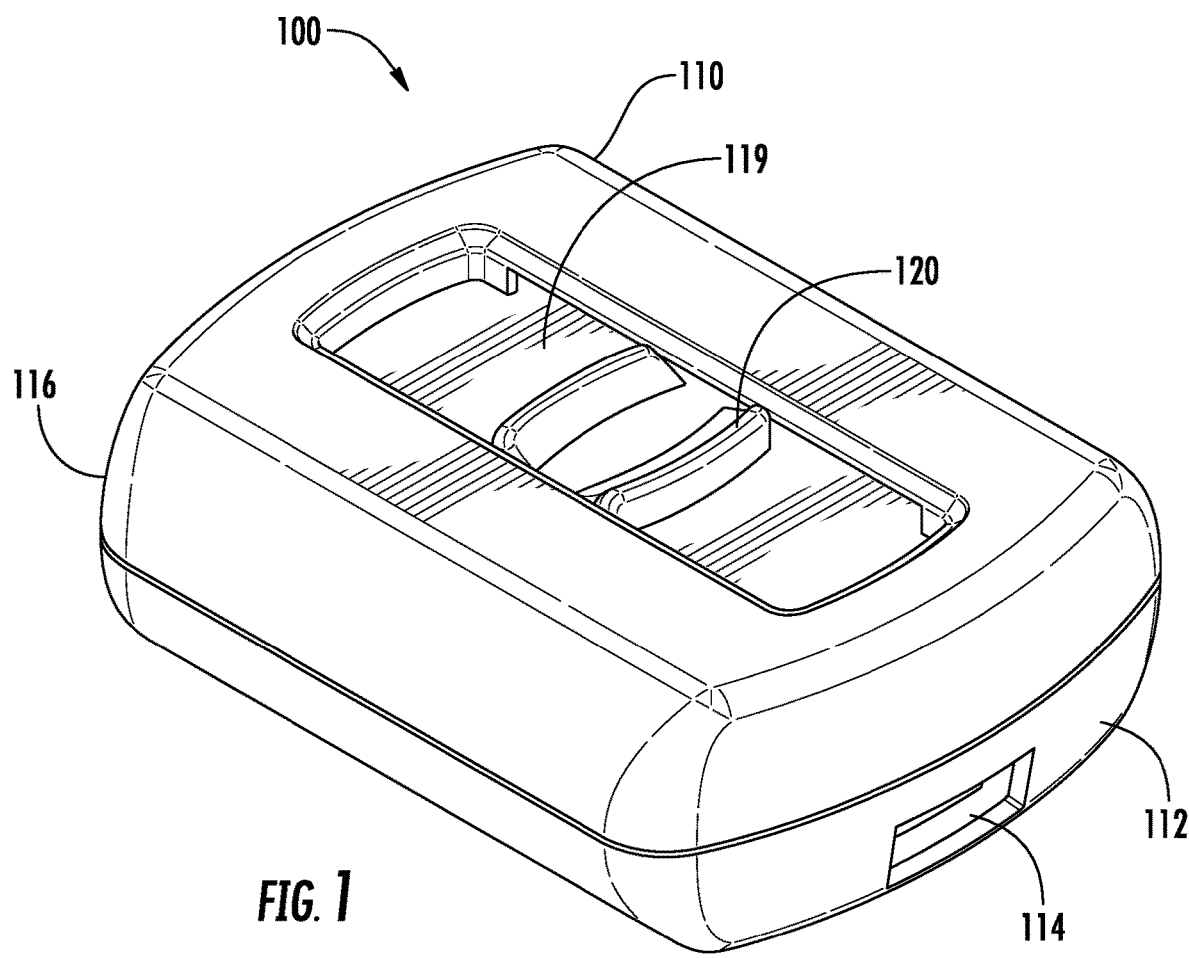
FIG. 1 is a perspective view of an apparatus, the portable charger, in accordance with some embodiments.

FIG. 1 is a perspective view of an apparatus, the portable charger 100, in accordance with some embodiments. The portable charger 100 has a housing 110 with rounded corners, smooth edges and smooth surfaces. The housing 110 has a first end 112 with a first opening 114 and a second end 116 with a second opening 118 (not shown in FIG. 1; see FIG. 4). The first end 112 of the housing 110 and the second end 116 of the housing 110 are opposite one another. An aperture 119 is located on a top surface of the housing 110.

An activator 120 is coupled to the housing 110 and accessible through the aperture 119. In some embodiments, the activator 120 is flush with, or recessed below, the top surface of the housing 110. The activator 120 is configured to move between the first end 112 of the housing 110 and the second end 116 of the housing 110 when a force is applied to the activator 120. The length of travel of the activator 120 may be limited by the size of the aperture 119 in the direction of travel between the first end 112 and the second end 116. A user may easily and conveniently move the activator 120 by placing a finger or thumb (or other appropriate device) on the activator 120 and sliding the activator 120 in a translational motion. In some embodiments, the user may use a downward force on the activator 120 while applying the translational motion to engage the activator 120. The activator 120 may move from one side of the aperture 119 to the other side of the aperture 119. By designing the activator 120 to be flush with or recessed in the aperture 119 of the housing 110, there is less risk of inadvertently moving the activator 120 to one of the positions at which one of the connector ports (described below) is extended.

Figure 2A:
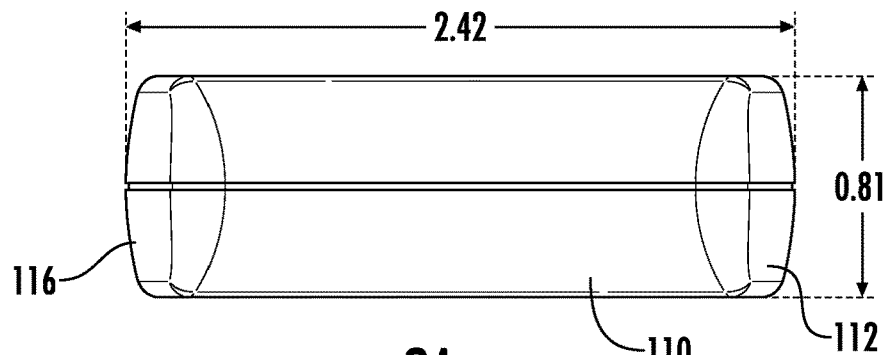
FIGS. 2A-2C are simplified schematics of a front view, side view and top view, respectively, of the portable charger, in accordance with some embodiments.
Figure 2B:
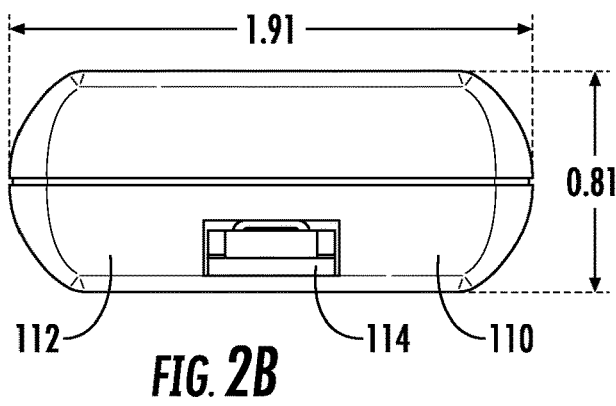
Figure 2C:
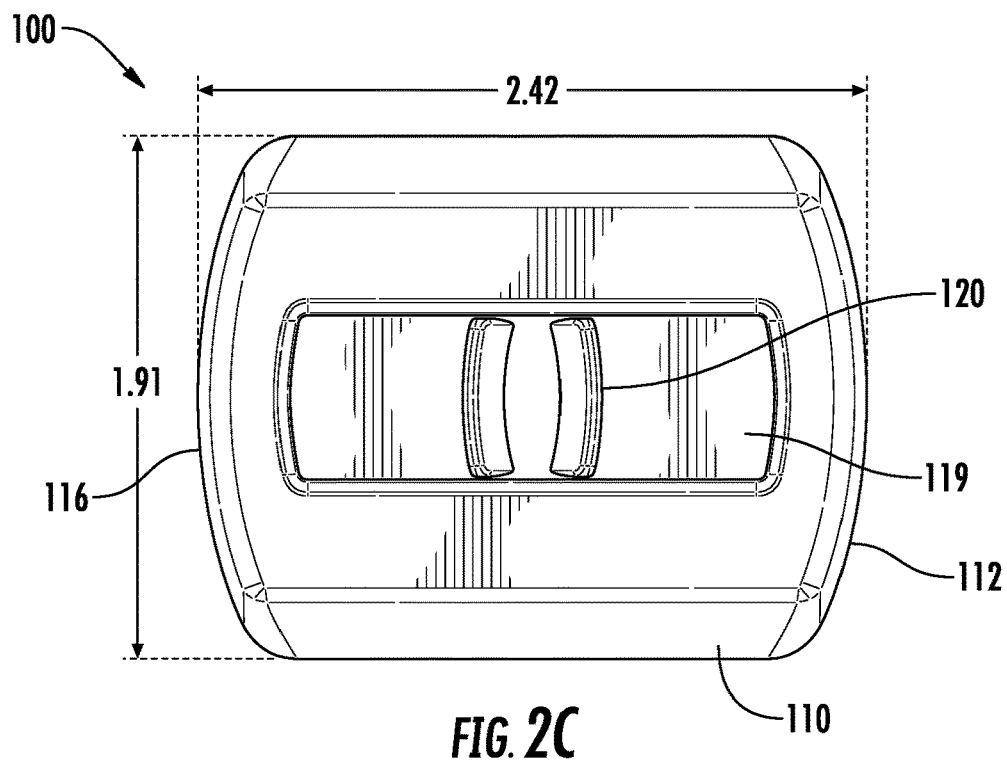

The portable charger 100 is small and lightweight enabling it to fit comfortably in a pocket or purse. FIGS. 2A-2C are simplified schematics of a front view, side view and top view, respectively, of the portable charger 100, in accordance with some embodiments. Sample, non-limiting dimensions in inches are shown to demonstrate the small size of the portable charger 100.

Figure 3:
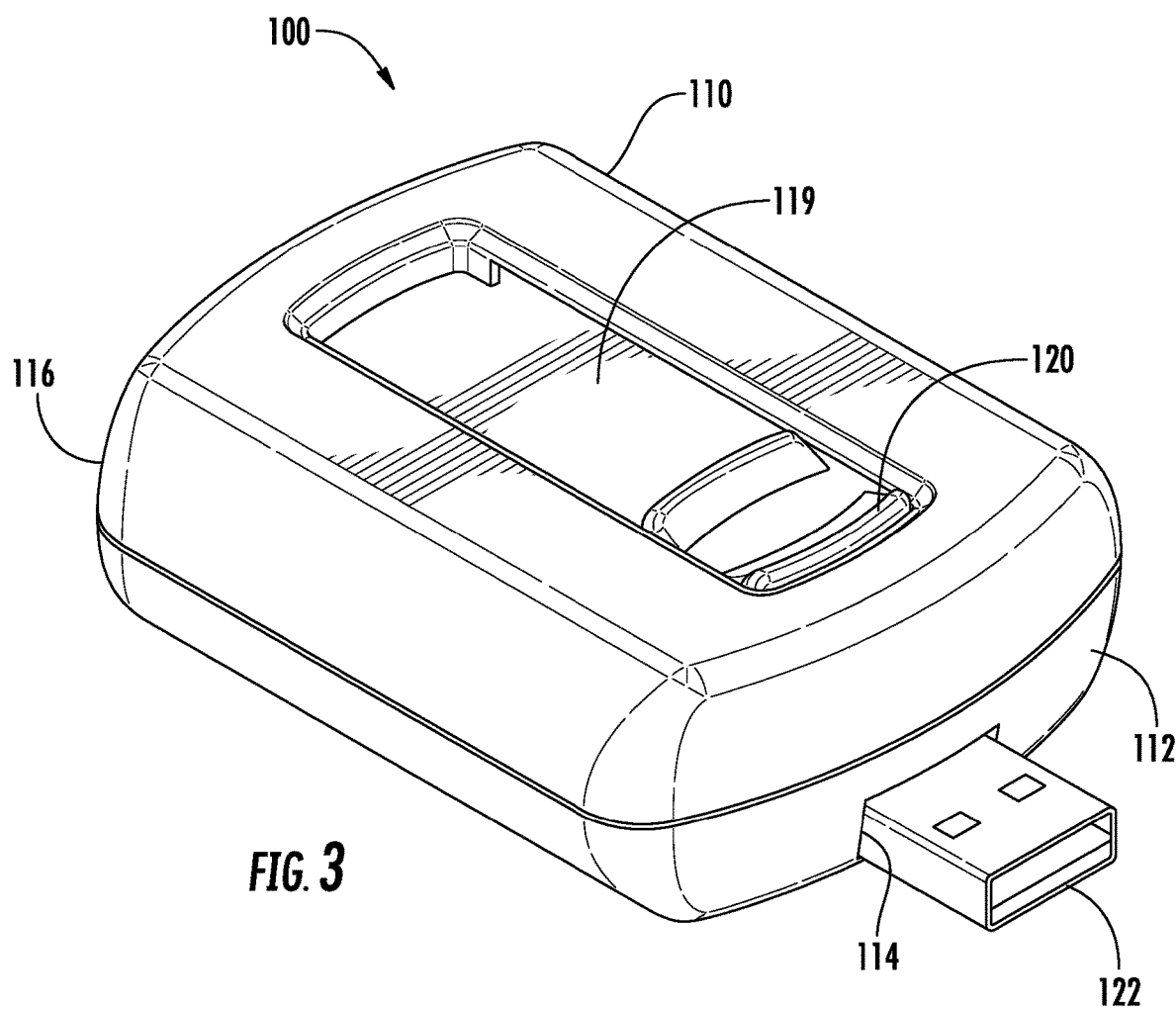
FIGS. 3 and 4 are perspective views of the portable charger, in accordance with some embodiments.
Figure 4:
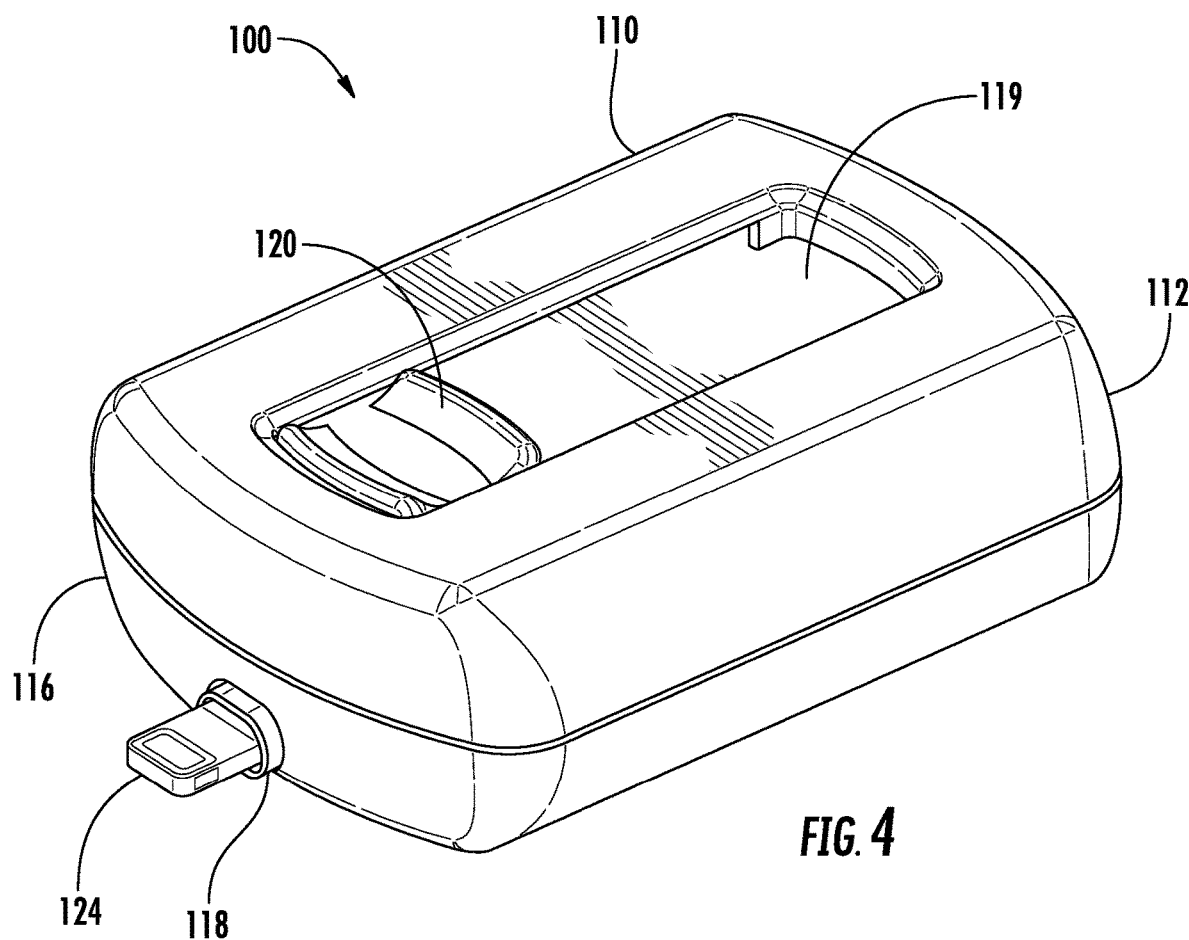

FIGS. 3 and 4 are perspective views of the portable charger 100, in accordance with some embodiments. The housing 110 has a first connector port 122 at the first end 112 of the housing 110 and a second connector port 124 at the second end 116 of the housing 110. The activator 120, the first connector port 122, and the second connector port 124 are configured, or connected together, to simultaneously move both the first connector port 122 and the second connector port 124 when a force is applied to the activator 120. The first opening 114 on the first end 112 of the housing 110 enables the first connector port 122 to extend beyond (or outside of) the housing 110 and retract into the housing 110, and the second opening 118 on the second end 116 of the housing 110 enables the second connector port 124 to extend beyond (or outside of) the housing 110 and retract into the housing 110. The first connector port 122 may be a USB connector, a mini-USB connector or a micro-USB connector. The second connector port 124 may be a USB connector, a mini-USB connector, a micro-USB or a Lightning™ connector. Other suitable USB or non-USB connectors may be used as technology in connectors evolves.

In some embodiments, when the activator 120 is located at a midpoint between the first end 112 of the housing 110 and the second end 116 of the housing 110, the first connector port 122 and the second connector port 124 are both retracted into the housing 110, as shown in FIG. 1. In this configuration, the first connector port 122 and the second connector port 124 are protected from potential damage, such as bending or breaking, and from debris. This configuration may be used when the portable charger 100 is not in use or while carrying or transporting the portable charger 100. In some embodiments, the portable charger 100 is inoperable in this configuration,—that is, when the activator 120 is located at a midpoint between the first end 112 of the housing 110 and the second end 116 of the housing 110, the first connector port 122 and the second connector port 124 are retracted into the housing 110, and thus inaccessible for operation. In some embodiments, the portable charger 100 is operable in this configuration, such as with the use of an optional specially-designed external cable 140 (discussed hereafter; see FIG. 7) coupled to the first connector port 122 (or alternatively to the second connector port 124).

The portable charger 100 has other configurations such as when the first connector port 122 is extended beyond the housing 110 through the first opening 114 on the first end 112 of the housing 110, the second connector port 124 is retracted further into the housing 110, as shown in FIG. 3. As shown in FIG. 4, when the second connector port 124 is extended beyond the housing 110 through the second opening 118 on the second end 116 of the housing 110, the first connector port 122 is retracted further into the housing 110.

Figure 5:
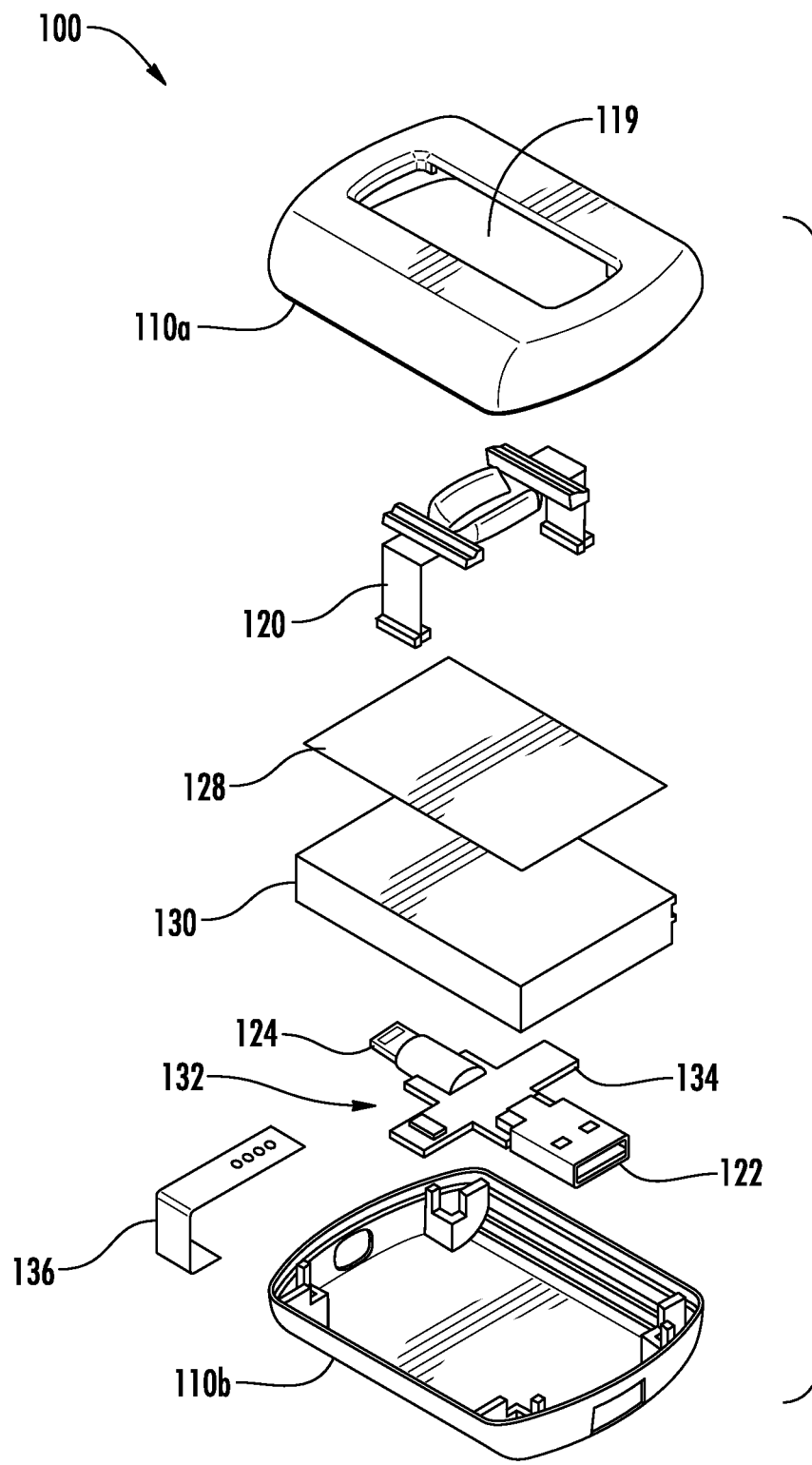
FIG. 5 is an exploded view of the portable charger, in accordance with some embodiments.

FIG. 5 is an exploded view of the portable charger 100, in accordance with some embodiments. The housing 110 may include an upper plate 110a with the aperture 119 and a lower plate 110b. When the upper plate 110a and lower plate 110b are coupled together, the housing 110 is formed. The upper plate 110a may be coupled to the activator 120 in a manner that allows the activator 120 to slide back and forth. In some embodiments, vertically below the activator 120 is a cover 128. The cover 128 prevents dirt or debris from entering areas below the cover 128 of the portable charger 100. The cover 128 may protect and hide the battery 130 and be aesthetically pleasing.

Vertically below the cover 128 is the internal battery 130. The internal battery 130 is chargeable and configured to provide power. In some embodiments, this occurs at the same time, or simultaneously. The internal battery 130 is electrically coupled to a bracket 132 disposed vertically under the battery 130. The bracket 132 includes a printed circuit board (PCB) 134, the first connector port 122 and the second connector port 124. The first and second connector ports 122 and 124 are mounted to the PCB 134 along with control circuitry (not shown) for controlling the charging and discharging of the battery 130. The internal battery 130 is electrically coupled to the first connector port 122 of the bracket 132 and configured to be charged via the first connector port 122 from an external (i.e., external to the portable charger 100) power source 133 (see FIG. 6), such as a wall socket, laptop, computer, tablet or other device with a compatible port, or from an outlet charger block 138 (see FIG. 6) connected to the external power source 133. The internal battery 130 is electrically coupled to the second connector port 124 of the bracket 132 and configured to provide power via the second connector port 124 to an external device (i.e., external to the portable charger 100). The external device may be a mobile phone, smartphone, personal digital assistant, audio player, tablet computer, smartwatch, or laptop computer.

A flat internal flexible cable 136 may be electrically coupled to the bracket 132 and wrapped around over the top side of the battery 130 or over the cover 128. The flat internal flexible cable 136 may include LEDs exposed through the aperture 119 to provide illumination that indicates operational conditions, such as different-colored LEDs that indicate that the battery 130 is being charged, is fully charged, is partially charged, is fully discharged, and/or is being discharged (i.e., is providing power to an external electronic device). The lower plate 110b is located vertically below the bracket 132. When the components shown in FIG. 5 are assembled, they form the portable charger 100.

Figure 6:
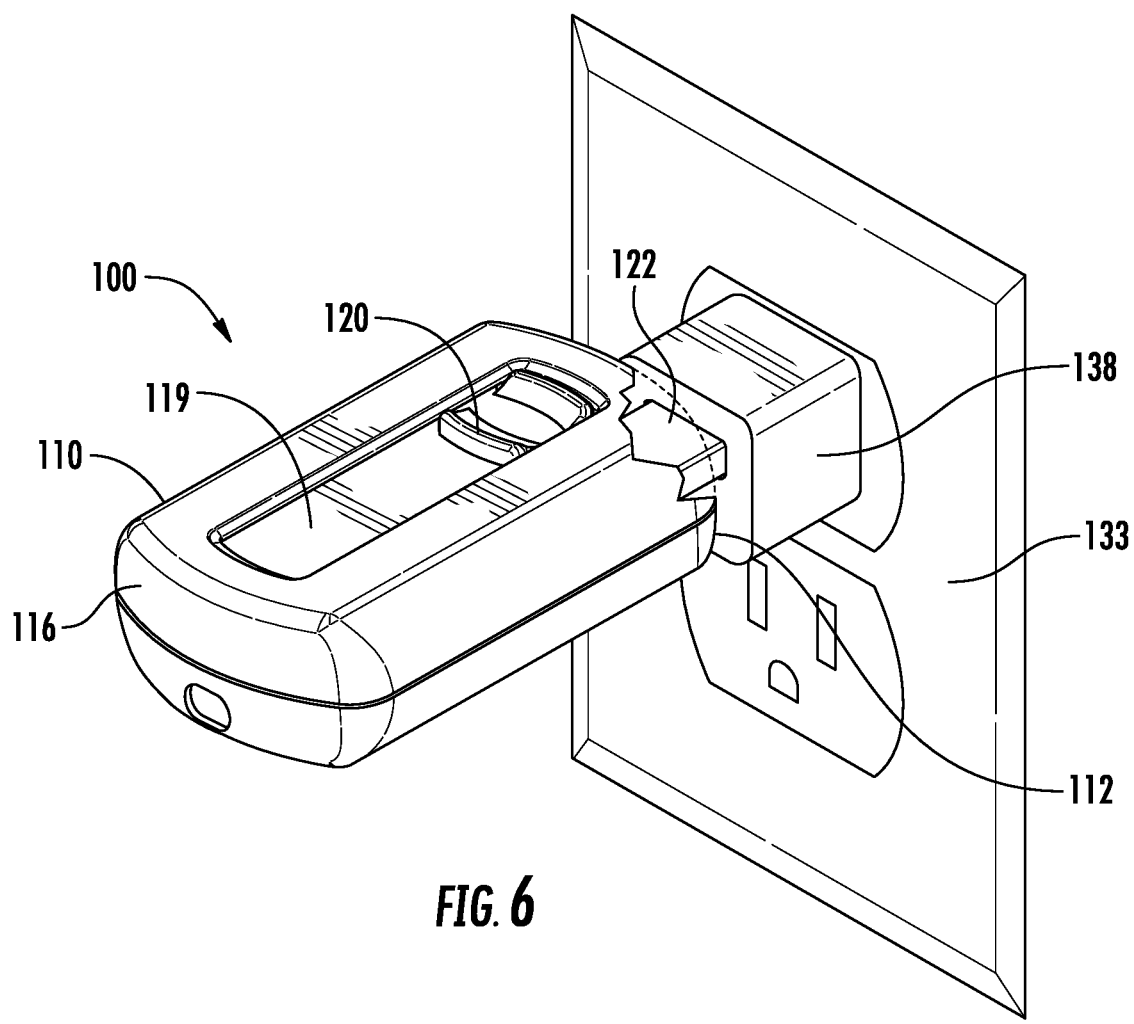
FIG. 6 is a perspective view of the portable charger and an outlet charger block connected together through a first connector port, without a cable, in accordance with some embodiments.

In some embodiments, the internal battery 130 is configured to be charged from the external power source 133 or the outlet charger block 138 without the use of an external cable via the first connector port 122. For example, a force may be applied to the activator 120 of the portable charger 100 to cause the first connector port 122 and the second connector port 124 to be simultaneously moved to a position at which the first connector port 122 is extended beyond the housing 110 through the first opening 114, and the second connector port 124 is retracted into the housing 110. Then, the first connector port 122 is coupled directly to the external power source 133 or the outlet charger block 138, without the use of an intervening cable therebetween, enabling the internal battery 130 to charge. FIG. 6 is a perspective view of the portable charger 100 and an outlet charger block 138 connected together through a first connector port 122, without a cable, in accordance with some embodiments. In this example, the portable charger 100 is coupled directly to the outlet charger block 138 connected to the wall socket which is the external power source 133. In other embodiments, the portable charger 100 is coupled directly to a laptop computer through the first connector port 122 to charge the internal battery 130. In some embodiments, the dimensions of the portable charger 100 are such that it can lay flat next to the laptop computer, or without placing undue stress on the first connector port 122, while plugged into the appropriate port of the laptop computer. Being able to charge the internal battery 130 with the portable charger 100 without a cable is very convenient to the user and represents an advantage of the present invention. For example, when internal battery 130 of the portable charger 100 runs out of power and therefore needs to be charged, the user can quickly and efficiently couple the first connector port 122 to the external power source 133 or the outlet charger block 138 without having to search for an added, loose, compatible cable.

Figure 7:
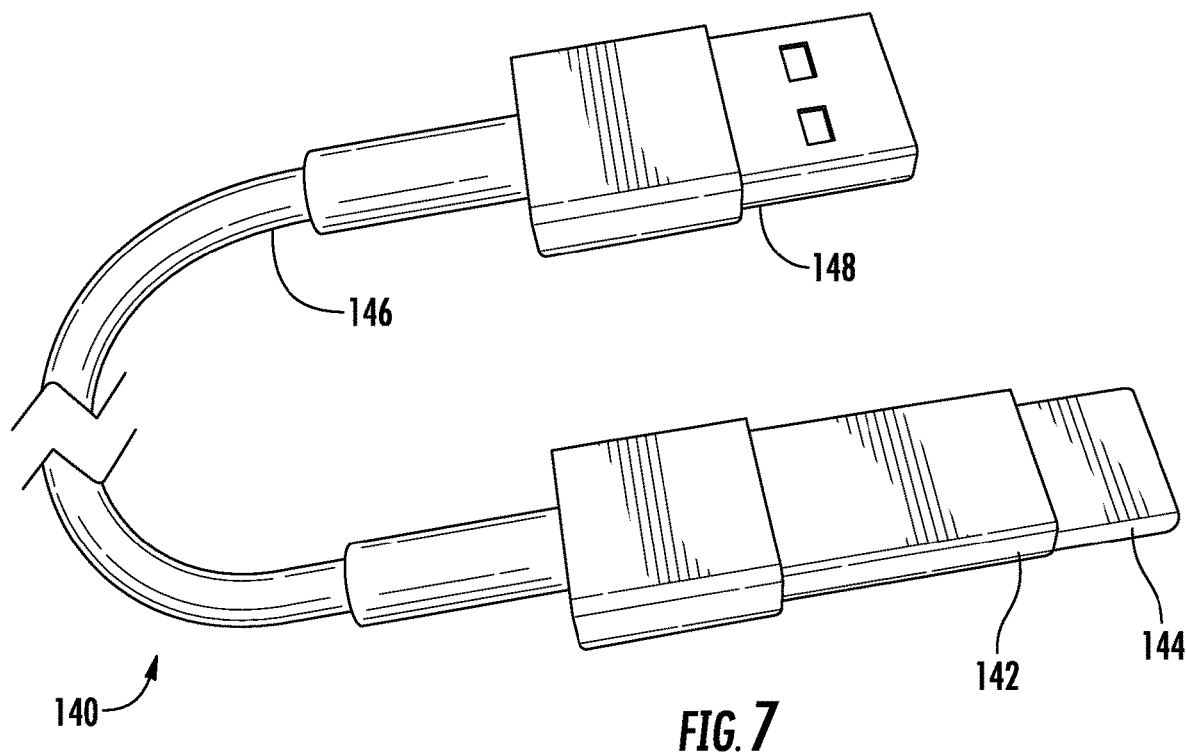
FIG. 7 is a perspective view of a specially-designed external cable for the portable charger, in accordance with some embodiments.

In some embodiments, the internal battery 130 is configured to be charged from the external power source 133 or the outlet charger block 138 via the optional specially-designed external cable 140 coupled to the first connector port 122. This may occur when the first connector port 122 is extended from the housing 110 through first opening 114 in the housing 110 or when the first connector port 122 is retracted into the housing 110. FIG. 7 is a perspective view of the specially-designed external cable 140 for the portable charger 100, in accordance with some embodiments. The specially-designed external cable 140 has a first end 142 and a second end 146. The first end 142 and the second end 146 of the specially-designed external cable 140 are opposite one another. The first end 142 of the specially-designed external cable 140 has a first cable connector plug 144 and may be coupled to the first connector port 122 through the first opening 114 of the housing 110. The first cable connector plug 144 may be a USB connector, a mini-USB connector, a micro-USB connector, or other appropriate USB or non-USB connector.

Figure 8:
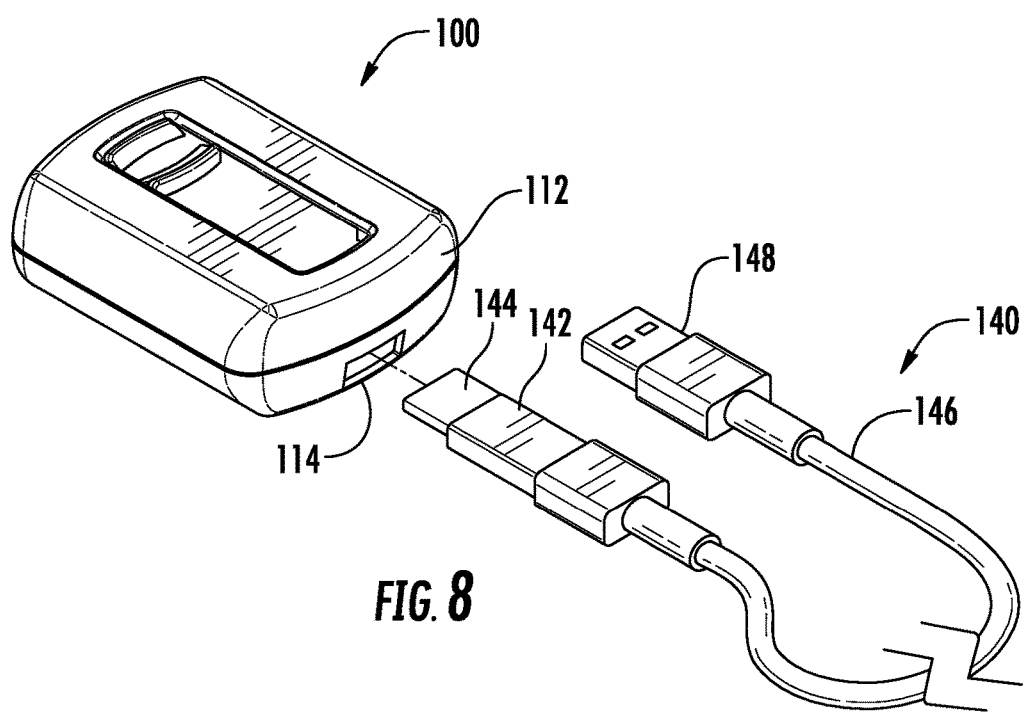
FIG. 8 is a perspective view of the specially-designed external cable and the portable charger, in accordance with some embodiments.

FIG. 8 is a perspective view of the specially-designed external cable 140 and the portable charger 100, in accordance with some embodiments. The first cable connector plug 144 and may be coupled to the first connector port 122 through the first opening 114 of the first end 112 of the housing 110. In some embodiments, this may occur when the activator 120 has been moved through the aperture 119 of the housing 110 so that the second connector port 124 is extended beyond the housing 110 and the first connector port 122 is retracted into the housing. In other embodiments, this may occur when the activator 120 is located at a midpoint between the first end 112 and the second end 116 of the housing 110 so that the first connector port 122 and the second connector port 124 are both retracted into the housing 110. In some embodiments, the first connector port 122 is configured to have a typical external dimension for a USB connector. Additionally, an internal surface of the first opening 114 is only slightly larger than the external dimension of the first connector port 122, so that the first opening 114 has a very tight tolerance for allowing the first connector port 122 to slide therethrough. This tight tolerance is considered desirable to provide structural support for the first connector port 122 when the first connector port 122 is extended beyond the housing 110. A conventional USB cable connector, however, is typically configured to surround the type of USB connector of the first connector port 122, such that the conventional USB cable connector cannot fit through the first opening 114, so the conventional USB cable connector can connect to the first connector port 122 only when the first connector port 122 is extended beyond the housing 110, but not when the first connector port 122 is retracted into the housing 110. The specially-designed external cable 140, on the other hand, includes a portion (adjacent the first cable connector plug 144) with an external dimension that generally matches the external dimension of the first connector port 122. This portion of the specially-designed external cable 140, therefore, can fit through the first opening 114, so that the first cable connector plug 144 has the advantage that it can connect to the first connector port 122 when the first connector port 122 is retracted into the housing 110, as well as when it is extended beyond the housing 110.

The second end 146 of the specially-designed external cable 140 has a second cable connector plug 148 and is coupled directly to the external power source 133 or the outlet charger block 138, enabling the internal battery 130 to charge. For example, the second cable connector plug 148 of the second end 146 of the specially-designed external cable 140 is coupled to the outlet charger block 138 connected to the wall socket which is the external power source 133. The second cable connector plug 148 may be a USB connector, a mini-USB connector, a micro-USB connector, or other appropriate USB or non-USB connector. The use of the specially-designed external cable 140 is optional.

Figure 9:
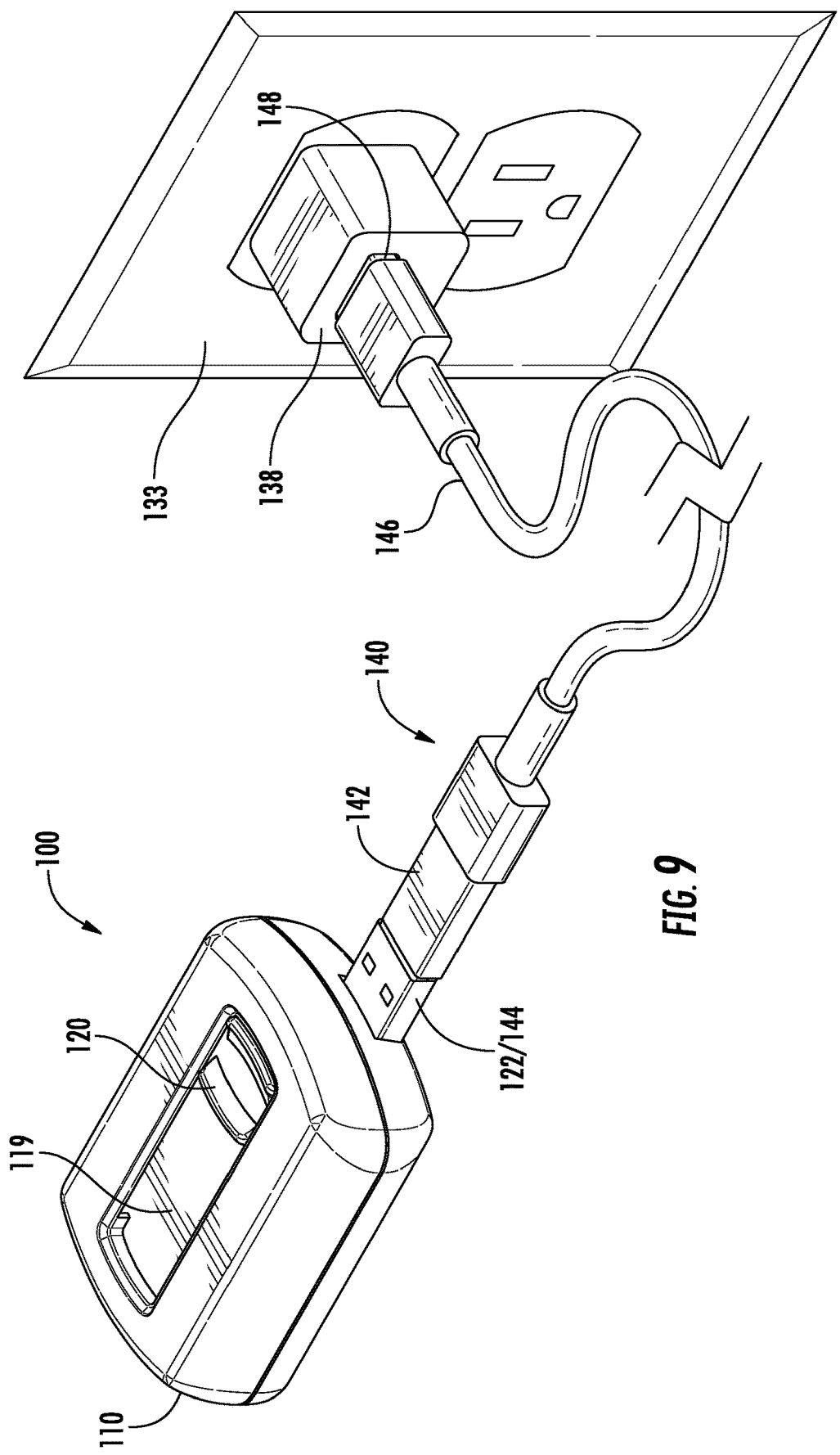
FIG. 9 is a perspective view of the portable charger, the specially-designed external cable, and an outlet charger block connected together, in accordance with some embodiments.

FIG. 9 is a perspective view of the portable charger 100, the specially-designed external cable 140, and an outlet charger block 138 connected together, in accordance with some embodiments. The portable charger 100 is charging through the first connector port 122 with the specially-designed external cable 140 connected to the outlet charger block 138 and the external power source 133. The first connector port 122 is configured to be coupled to the specially-designed external cable 140 when the first connector port 122 is extended through the first opening 114, and beyond the housing 110. For example, a force may be applied to the activator 120 of the portable charger 100. The first connector port 122 and the second connector port 124 are simultaneously moved to a position at which the first connector port 122 is extended beyond the housing 110 through the first opening 114, and the second connector port 124 is retracted into the housing 110. The first cable connector plug 144 of the first end 142 of the specially-designed external cable 140 is coupled to the first connector port 122, and the second cable connector plug 148 of the second end 146 of the specially-designed external cable 140 is coupled to the external power source 133, enabling the internal battery 130 to charge.

Figure 10:
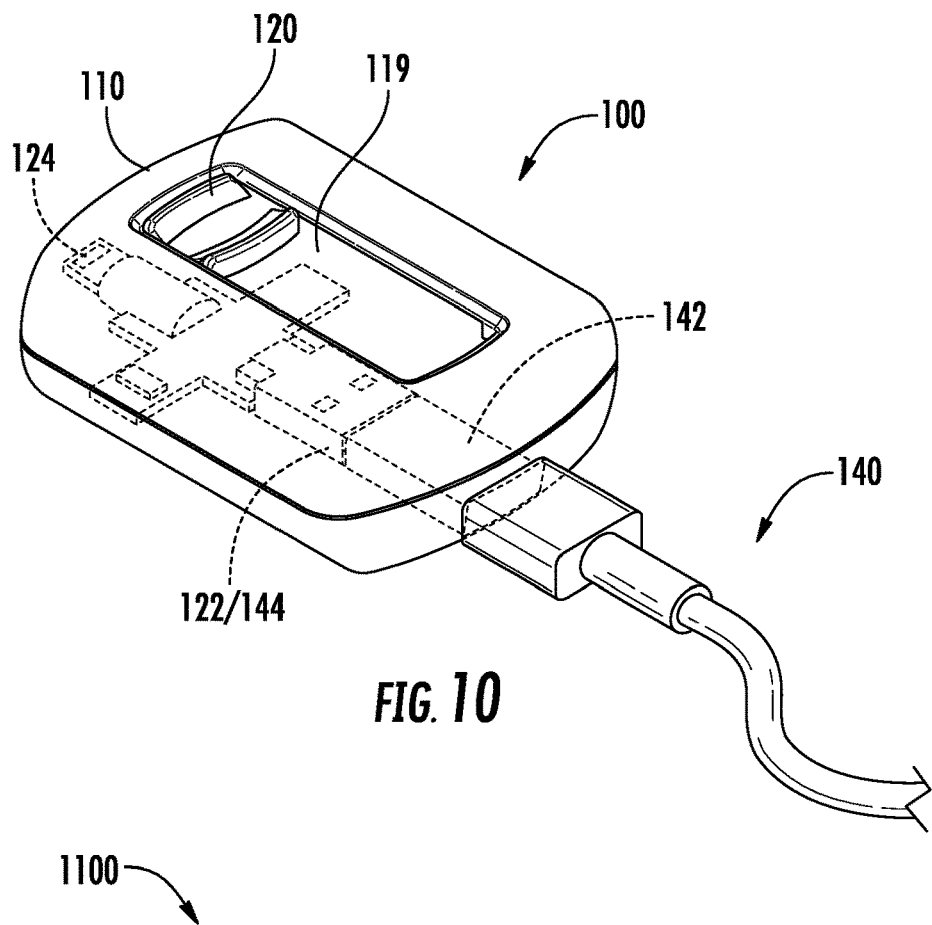
FIG. 10 is a perspective view of the portable charger and the specially-designed external cable coupled together, in accordance with some embodiments.

In some embodiments, the first connector port 122 is configured to be coupled to the specially-designed external cable 140 when the first connector port 122 is retracted through the first opening 114 of the housing 110 into the housing 110. FIG. 10 is a perspective view of the portable charger 100 and the specially-designed external cable 140 coupled together, in accordance with some embodiments. For example, the specially-designed external cable 140 with the first cable connector plug 144 is configured to be inserted through the first opening 114 and into the housing 110. The first cable connector plug 144, thus, can be coupled to the first connector port 122 when the first connector port 122 is retracted into the housing 110, e.g., when both the first and second connector ports 122 and 124 are retracted into the housing 110, with the activator 120 at the midpoint, or when the first connector port 122 is further retracted into the housing 110 and the second connector port 124 is extended beyond the housing 110 through the second opening 118 in the housing 110 (as illustrated in FIG. 10). In some embodiments, the first connector port 122 can be retracted into the housing 110 before the first cable connector plug 144 is connected thereto. In this case, the first cable connector plug 144 is then inserted through the first opening 114 in the housing 110 to engage the first connector port 122. In other embodiments, the first connector port 122 and the first cable connector plug 144 can be connected together while the first connector port 122 is extended out of the housing 110, and then the activator 120 can be operated to slide the first connector port 122 (with the first cable connector plug 144 already connected thereto) into the retracted position, thereby pulling the first cable connector plug 144 along with the first connector port 122 into the housing 110.

Figure 11:
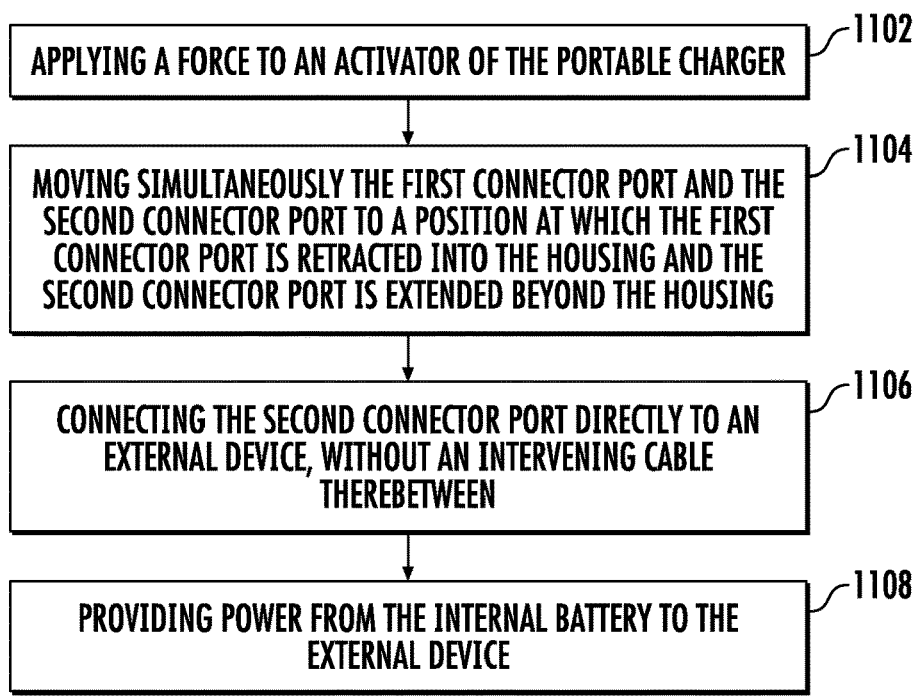
FIG. 11 illustrates a method for providing power to an external device, in accordance with some embodiments.

FIG. 11 illustrates a method 1100 for providing power to an external device 150 (see FIG. 12), in accordance with some embodiments. The particular steps, order of steps, and combination of steps shown for the method 1100 are provided for illustrative and explanatory purposes only. Other embodiments may specify different particular steps, order of steps, or combination of steps for performing generally the same function of providing power to the external device 150. At step 1102, a force is applied to the activator 120 of the apparatus, the portable charger 100. The portable charger 100 has the internal battery 130, the housing 110, the first connector port 122, and the second connector port 124. At step 1104, the first connector port 122 and the second connector port 124 are simultaneously moved to a position at which the first connector port 122 is retracted into the housing 110 through the first opening 114 in the housing 110 and the second connector port 124 is extended beyond the housing 110 through the second opening 118 in the housing 110 on the second end 116 of the housing 110. At step 1106, the second connector port 124 is connected to the external device 150, without an intervening cable therebetween. At step 1108, power from the internal battery 130 is provided to the external device 150.

Figure 12:
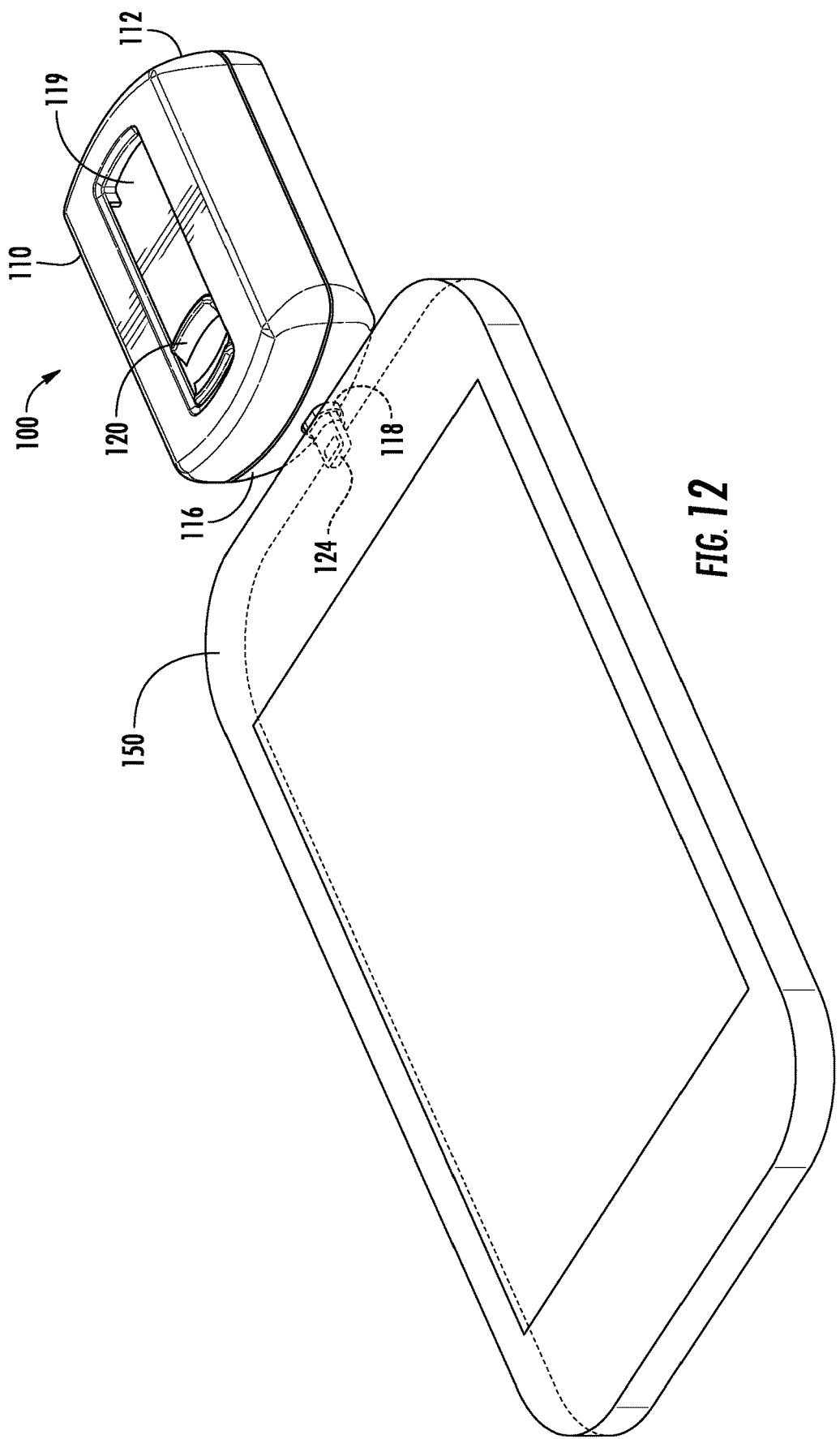
FIG. 12 is a perspective view of the portable charger providing power to the external device, in accordance with some embodiments.

The second connector port 124 is configured to be directly coupled to the external device 150, i.e., without an intervening external cable or adapter between the second connector port 124 and a matching connector port on the external device 150. FIG. 12 is a perspective view of the portable charger 100 providing power to the external device 150, in accordance with some embodiments. In this example, the second connector port 124 of the portable charger 100 is coupled directly to the external device 150 via a charging port on the external device 150.

FIG. 13 illustrates a method 1300 for charging the portable charger 100 while simultaneously providing power to the external device 150, in accordance with some embodiments. The particular steps, order of steps, and combination of steps shown for the method 1300 are provided for illustrative and explanatory purposes only. Other embodiments may specify different particular steps, order of steps, or combination of steps for performing generally the same function of simultaneously charging the internal battery 130 and providing power to the external device 150. At step 1302 an apparatus, the portable charger 100, is provided. The portable charger 100 includes the internal battery 130, the activator 120, the housing 110 the first connector port 122, and the second connector port 124, as described above. At step 1304, a force is applied to the activator 120 to simultaneously move the first connector port 122 and the second connector port 124 to a position at which the first connector port 122 is retracted into the housing 110 and the second connector port 124 is extended beyond the housing 110 through the second opening 118 in the housing 110. The portable charger 100 in this configuration is shown in FIG. 10.

At step 1306, the specially-designed external cable 140 is coupled to the external power source 133 (e.g., either directly or with the outlet charger block 138) and to the first connector port 122 through the first opening 114 of the first end 112 of the housing 110, even though the first connector port 122 is retracted into the housing 110. At step 1308, the second connector port 124 is connected to the external device 150 when the second connector port 124 is extended beyond the housing 110. At step 1310, the internal battery 130 is charged via the specially-designed external cable 140 coupled to the external power source 133 (e.g., either directly or with the outlet charger block 138) while simultaneously providing power from the internal battery 130 to the external device 150. In an alternative embodiment for simultaneously charging the internal battery 130 and providing power to the external device 150, the first and second connector ports 122 and 124 are moved to the position at which the first connector port 122 is extended out of the housing 110 and the second connector port 124 is retracted into the housing 110, as shown in FIG. 3. A cable (not shown) with a connector configured or adapted to be inserted through the second opening 118 is connected to the second connector port 124 within the housing 110; and the first connector port 122 is connected to the external power source 133 (e.g., either directly or with the outlet charger block 138) with or without the specially-designed external cable 140 in between.

The portable charger 100 includes circuitry, such as the PCB 134, coupled to the internal battery 130. This circuitry enables the internal battery 130 to be charged while simultaneously providing power to the external device 150. For example, the internal battery 130 is configured to be charged from the external power source 133 when the first connector port 122 is retracted into the housing 110 through the first opening 114 (as shown by FIG. 10) while simultaneously providing power to the external device 150 when the second connector port 124 is extended beyond the housing 110 through the second opening 118 (as shown by FIG. 12), thereby combining embodiments of FIGS. 10 and 12.

The design feature of the internal battery 130 of the portable charger 100 being configured to be internally charged while simultaneously providing power to the external device 150 is an improvement in technology and counterintuitive in the industry. This enables the portable charger 100 to be a fully functional, self-contained device that can perform both functions at once—that is, charging the internal battery while providing power. In the prior art, similar designs with a first connector and a second connector opposite one another that are configured to extend and retract into a housing have, for example, separate circuitry or mechanical locking features that purposely prevent simultaneous access of both the first connector and the second connector—that is, performing functions of the first connector and the second connector at the same time. For example, in a dual-interface flash drive, if both connectors of a flash drive are simultaneously connected, the two interfaces using the two connectors can attempt to access the flash memory at the same time resulting in, for example, the two interfaces attempting conflicting writes. This may corrupt the data in the flash memory or damage the dual-interface flash drive. Therefore, it is imperative that the two connectors of the flash drive not be simultaneously accessible. In contrast, the first connector port 122 and the second connector port 124 of the portable charger 100 of the present application, are designed to be simultaneously connected while performing their given functions, since a battery has no conflict similar to that of the flash drive.

The design features of charging the internal battery 130 of the portable charger 100 or providing power to the external device 150, without a cable in either case, is an improvement in technology. Disclosed herein, the internal battery 130 may be charged via the first connector port 122 coupled directly to the external power source 133, or through the outlet charger block 138. Moreover, the second connector port 124 may be coupled directly to the external device 150 to provide power to the external device 150. This capability means that the user only has to carry and transport the portable charger 100, without any added cables or other accessories if the user so chooses, thereby making it easy and convenient to use the portable charger 100 and thus, keeping the portable charger 100 charged. For example, the user can carry and transport the portable charger 100 in a pocket or purse without having to keep track of messy, tangled cables, and the risk of forgetting the cable is eliminated. In contrast, for a conventional portable charger, external cables are necessary for the operation of the conventional portable charger, so if the user forgot the cables, the portable charger could not be charged and would be useless after the battery had discharged.

Reference has been made in detail to embodiments of the disclosed invention, one or more examples of which have been illustrated in the accompanying figures. Each example has been provided by way of explanation of the present technology, not as a limitation of the present technology. In fact, while the specification has been described in detail with respect to specific embodiments of the invention, it will be appreciated that those skilled in the art, upon attaining an understanding of the foregoing, may readily conceive of alterations to, variations of, and equivalents to these embodiments. For instance, features illustrated or described as part of one embodiment may be used with another embodiment to yield a still further embodiment. Thus, it is intended that the present subject matter covers all such modifications and variations within the scope of the appended claims and their equivalents. These and other modifications and variations to the present invention may be practiced by those of ordinary skill in the art, without departing from the scope of the present invention, which is more particularly set forth in the appended claims. Furthermore, those of ordinary skill in the art will appreciate that the foregoing description is by way of example only, and is not intended to limit the invention.

What is claimed is:

1. An apparatus comprising:
   a power-providing connector port configured to be directly coupled to an external device without an intervening cable or an adapter connected between the apparatus and the external device; and
   an internal battery coupled to the power-providing connector port and wherein the internal battery is configured to provide power via the power-providing connector port to the external device.

2. The apparatus of claim 1, wherein the power-providing connector port is a USB connector, a mini-USB connector, a micro-USB connector or a Lightning connector.

3. The apparatus of claim 1, wherein the internal battery is configured to be charged from an external power source while simultaneously providing power to the external device.

4. The apparatus of claim 1, further comprising:
   circuitry coupled to the internal battery enabling the internal battery to be charged while simultaneously providing power to the external device.

5. The apparatus of claim 1, further comprising:
   an activator configured to move the power-providing connector port when a force is applied to the activator, wherein the activator is configured to extend the power-providing connector port beyond a housing and to retract the power-providing connector port into the housing.

6. The apparatus of claim 1, further comprising:
   a charging connector port; and
   a bracket comprising the charging connector port at a first end of the bracket and the power-providing connector port at a second end of the bracket.

7. The apparatus of claim 6, wherein:
   the bracket further comprises a printed circuit board (PCB); and
   the charging connector port and the power-providing connector port are mounted to the PCB.

8. The apparatus of claim 7, wherein:
   the PCB includes control circuitry that controls charging and discharging of the internal battery.

9. The apparatus of claim 6, wherein the charging connector port is a USB connector, a mini-USB connector or a micro-USB connector.

10. The apparatus of claim 6, wherein the charging connector port is configured to be connected to an external power source without the use of a cable therebetween.

11. The apparatus of claim 6, wherein the internal battery is configured to be charged from an external power source via a cable coupled to the charging connector port.

12. The apparatus of claim 6, wherein the charging connector port is configured to be coupled to a cable.

13. The apparatus of claim 6, further comprising:
   a housing; and
   a cable with a first cable connector plug configured to be inserted through a first opening of the housing and into the housing and to be coupled to the charging connector port.

14. The apparatus of claim 6, further comprising:
   a housing;
   wherein:
   the housing has a first opening in a first surface of the housing and a second opening in a second surface of the housing;
   the charging connector port is positioned at the first opening of the housing;
   the power-providing connector port is positioned at the second opening of the housing; and
   the first surface of the housing and the second surface of the housing are on opposite ends of the housing.

15. The apparatus of claim 6, further comprising:
   an activator configured to simultaneously move the charging connector port and the power-providing connector port, wherein the activator simultaneously extends the charging connector port beyond a housing and retracts the power-providing connector port into the housing, and the activator simultaneously extends the power-providing connector port beyond the housing and retracts the charging connector port into the housing.

* * * * *